United States Patent
MacDonald et al.

(10) Patent No.: US 9,470,152 B2
(45) Date of Patent: Oct. 18, 2016

(54) ENGINE FUEL CONTROL SYSTEM

(71) Applicant: ROLLS-ROYCE CONTROLS AND DATA SERVICES LIMITED, Derby, Derbyshire (GB)

(72) Inventors: Alexander MacDonald, Burton-on-Trent (GB); Mohammad Khalid Khan, Birmingham (GB); Nigel Herbert Henson, Warwick (GB)

(73) Assignee: ROLLS-ROYCE CONTROLS AND DATA SERVICES LIMITED, Derby (GB)

( * ) Notice: Subject to any disclaimer, the term of this patent is extended or adjusted under 35 U.S.C. 154(b) by 404 days.

(21) Appl. No.: 14/155,005

(22) Filed: Jan. 14, 2014

(65) Prior Publication Data
US 2014/0216037 A1 Aug. 7, 2014

(30) Foreign Application Priority Data
Feb. 1, 2013 (GB) .................................... 1301791.8

(51) Int. Cl.
F02C 7/232 (2006.01)
F02C 9/26 (2006.01)
F02C 9/28 (2006.01)

(52) U.S. Cl.
CPC .............. F02C 7/232 (2013.01); F02C 9/263 (2013.01); F02C 9/28 (2013.01)

(58) Field of Classification Search
CPC ....................................................... F02C 9/28
See application file for complete search history.

(56) References Cited

U.S. PATENT DOCUMENTS

| 6,704,630 B2 | 3/2004 | Ostrom et al. | |
| 6,745,556 B2 | 6/2004 | Elliott | |
| 7,137,242 B2 | 11/2006 | Griffiths | |
| 7,587,900 B2 * | 9/2009 | Shelby | F02C 7/232 60/39.281 |
| 2010/0121553 A1* | 5/2010 | Milnes | F02C 7/232 701/100 |
| 2010/0275575 A1 | 11/2010 | Brown | |
| 2011/0146823 A1 | 6/2011 | Griffiths et al. | |

FOREIGN PATENT DOCUMENTS

| EP | 2 258 927 A2 | 5/2010 |
| EP | 2 339 147 A2 | 6/2011 |

* cited by examiner

*Primary Examiner* — John C Hong
(74) *Attorney, Agent, or Firm* — Oliff PLC

(57) ABSTRACT

An engine fuel control system includes a metering valve to control fuel flow between the supply and delivery line with a pressure drop control regulating the pressure across the valve and maintain a substantially constant pressure across the valve. The fuel control system includes a backup system controllable by a pullback signal to operate the pressure control, thus increasing the pullback signal reducing the fuel flow between the supply and delivery line. The fuel control system detects a start of an engine overthrust event, and when the upward runaway is caused by the arrested overthrust event. The fuel control system's controller which (i) determines the overthrust detection, the pullback signal increase rate and the pullback signal offset, (ii) sends the pullback signal to the backup system at the rate of increase, and (iii), reduces the pullback signal to the backup system when the upward runaway is arrested by the offset.

15 Claims, 11 Drawing Sheets

ENGINE FUEL CONTROL SYSTEM

FIELD OF THE INVENTION

The present invention relates to an engine fuel control system and in particular to a fuel control system for use in controlling the supply of fuel to a gas turbine engine.

BACKGROUND OF THE INVENTION

A typical fuel control system for use in controlling the supply of fuel to an aircraft engine comprises a metering valve operable to control the rate at which fuel passes from a supply line to a delivery line. A pressure drop control arrangement, for example comprising a pressure drop control valve and an associated spill valve, is operable to maintain a substantially constant pressure drop across the metering valve. A pressure raising and shut-off valve (PR-SOV) controls the passage of fuel from the delivery line to a burner manifold, the PRSOV serving, in use, to maintain a minimum fuel pressure in a part of the fuel control system upstream thereof, so as to ensure that any fuel pressure operated devices arranged to receive fuel under pressure from the fuel control system can operate correctly.

The fuel control system receives fuel under pressure from a pumping unit that is driven by, and so operates at a speed related to the operating speed of, the associated engine. There is a need to provide, within the fuel control system, a mechanism whereby thrust can be controlled in the event of an overthrust condition arising. The scenario where a fuel control (i.e. fuel metering valve) fails, causing an upward run-away of engine thrust, is referred to as "thrust control malfunction" or "overthrust". The un-commanded increase in thrust on one engine leads to a thrust imbalance (or thrust asymmetry) on the aircraft. The default response of a typical existing fuel control to an upward runaway is to shut-down the engine in order to protect the engine from overspeed induced failure. More recent aircraft and engine design combinations have arisen for which engine shut-down is not an acceptable response to thrust control malfunction at all flight conditions. At some flight conditions (i.e. landing approach) the flight crew may not be able to safely control a thrust asymmetry in one direction whilst the thrust asymmetry rapidly reverses (due to engine shut-down) and acts in the opposite direction. A means is therefore required to bring upward run-away failures under control, by maintaining operation and thrust from the faulty engine, rather than initiating shut-down of that engine.

A number of thrust control management, commonly known as thrust control malfunction accommodation (TCMA), systems to perform this function are known. For example U.S. Pat. No. 6,745,556 describes a TCMA system in which a control valve is operable to relieve the fuel pressure applied to one end of a metering valve with the result that the metering valve moves to a low or minimum fuel delivery position to allow fuel supply to the associated engine burner to be reduced. One of the arrangements described in U.S. Pat. No. 7,137,242 uses ports provided on a staging valve to allow the pressure at the inlet of the metering valve to be reduced in the event of an overthrust condition being sensed. EP 2339147 A describes a TCMA device operating in conjunction with a pressure drop control arrangement for a metering valve. The device comprises a control servo-valve which ensures that engine control can be maintained in the event of an overthrust condition in which fuel is delivered to a burner manifold at a rate higher than is desired, and also provides a mechanism whereby sufficient fuel can be delivered to the burner manifold under windmill relight conditions at which the engine is rotating at a relatively low speed.

SUMMARY OF THE INVENTION

It would be desirable to provide improved fuel flow management in the event of an engine overthrust event, e.g. caused by malfunction of a fuel metering valve.

Accordingly, in a first aspect the present invention provides an engine fuel control system (such as a gas turbine engine fuel control system) including:

a fuel metering valve operable to control the flow of fuel between a supply line and a delivery line, a pressure drop control arrangement operable to regulate a pressure drop across the metering valve, the pressure drop control arrangement maintaining in normal use a substantially constant pressure drop across the metering valve, an electro-mechanical backup control system which, in the event of an engine overthrust event, is controllable by an electrical pullback signal to operate the pressure drop control arrangement, such that increasing the pullback signal reduces the flow of fuel between the supply line and the delivery line, a detector arrangement which detects a start of an engine overthrust event, and detects a time at which an upward runaway caused by the overthrust event is arrested, and a controller which (i) determines, at the time of the overthrust detection, a rate of increase of the pullback signal and an offset of the pullback signal, (ii) sends the pullback signal to the backup control system at the determined rate of increase, and (iii), when the upward runaway is arrested, reduces the pullback signal sent to the backup control system by the determined offset.

Thus, rather than applying immediate closed loop control of the pullback signal based on engine power output when an overthrust event is detected, the present invention increases the pullback signal at the determined rate, which can rapidly reduce the fuel flow and thereby arrest the upward runaway. The pullback signal is then reduced by the determined offset. Advantageously, this can help to prevent an overshoot in the reducing fuel flow which might otherwise lead to an engine flameout event.

In a second aspect the present invention provides a gas turbine engine (e.g. an aircraft engine) having the engine fuel control system of the first aspect.

Optional features of the invention will now be set out. These are applicable singly or in any combination with any aspect of the invention.

The pullback signal can be e.g. a pullback current or a pullback voltage.

Conveniently, the controller may determine the rate of increase of the pullback signal as a function of an indicator of engine power output. For example, when the engine is a gas turbine engine, the indicator of engine power output can be a shaft rotational speed of the engine. However, another option is for the indicator to be a pressure ratio of the engine.

Conveniently, the rate of increase of the pullback signal can be a constant over time.

The controller may determine the pullback signal offset as a function of the determined pullback signal and/or as a function of an indicator of engine power output.

When the upward runaway is arrested and the offset applied, the controller may then (iv) maintain the pullback signal at its reduced value for a predetermined time period. This "settling delay" can help the fuel supply to converge more quickly to a stable set point. Thereafter, the controller can (v) apply closed loop control of the pullback current based on an indicator of engine power output (e.g. shaft speed or pressure ratio).

The backup control system may include an electromagnetically operated control servo valve. For example, the control servo valve can comprise a torque motor operated jet and nozzle type first stage that actuates a second stage spool valve arrangement.

The pressure drop control arrangement may comprise a spill valve and a pressure drop control valve. The spill valve and pressure drop control valve may be separate components or may be combined in a single valve. The spill valve may include a control chamber and be operable to alter the fuel flow through the supply line and thence through the metering valve. The pressure drop control valve can be operable to vary the spill valve control chamber pressure, thereby opening or closing the spill valve as required to alter the fuel flow through the supply line and the metering valve, and maintaining in normal use the substantially constant pressure drop across the metering valve. The spill valve may be a combining spill valve, operable in conjunction with a plurality of fuel pumps to control the fuel flow and pressure within the supply line.

The engine fuel control system may further include a pressure raising and shut-off valve which controls the passage of fuel from the delivery line.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
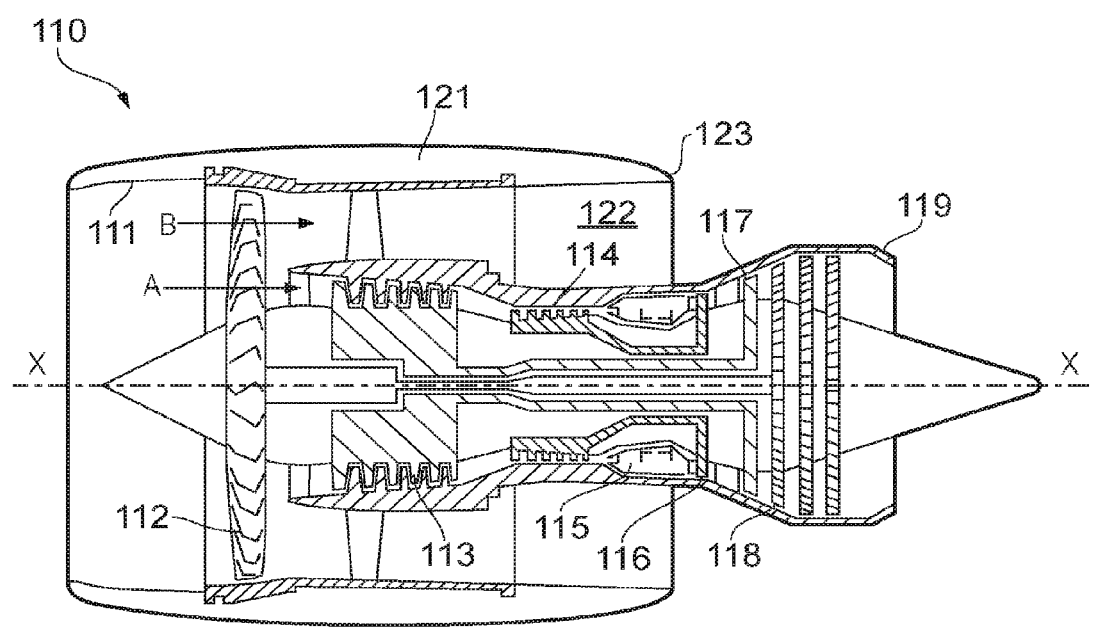
FIG. 1 shows a longitudinal section through a ducted fan gas turbine engine.

With reference to FIG. 1, a ducted fan gas turbine engine is generally indicated at 110 and has a principal and rotational axis X-X. The engine comprises, in axial flow series, an air intake 111, a propulsive fan 112, an intermediate pressure compressor 113, a high-pressure compressor 114, combustion equipment 115, a high-pressure turbine 116, an intermediate pressure turbine 117, a low-pressure turbine 118 and a core engine exhaust nozzle 119. A nacelle 121 generally surrounds the engine 110 and defines the intake 111, a bypass duct 122 and a bypass exhaust nozzle 123.

During operation, air entering the intake 111 is accelerated by the fan 112 to produce two air flows: a first air flow A into the intermediate pressure compressor 113 and a second air flow B which passes through the bypass duct 122 to provide propulsive thrust. The intermediate pressure compressor 113 compresses the air flow A directed into it before delivering that air to the high pressure compressor 114 where further compression takes place.

The compressed air exhausted from the high-pressure compressor 114 is directed into the combustion equipment 115 where it is mixed with fuel and the mixture combusted. The resultant hot combustion products then expand through, and thereby drive the high, intermediate and low-pressure turbines 116, 117, 118 before being exhausted through the nozzle 119 to provide additional propulsive thrust. The high, intermediate and low-pressure turbines respectively drive the high and intermediate pressure compressors 114, 113 and the fan 112 by suitable interconnecting shafts.

Figure 2:
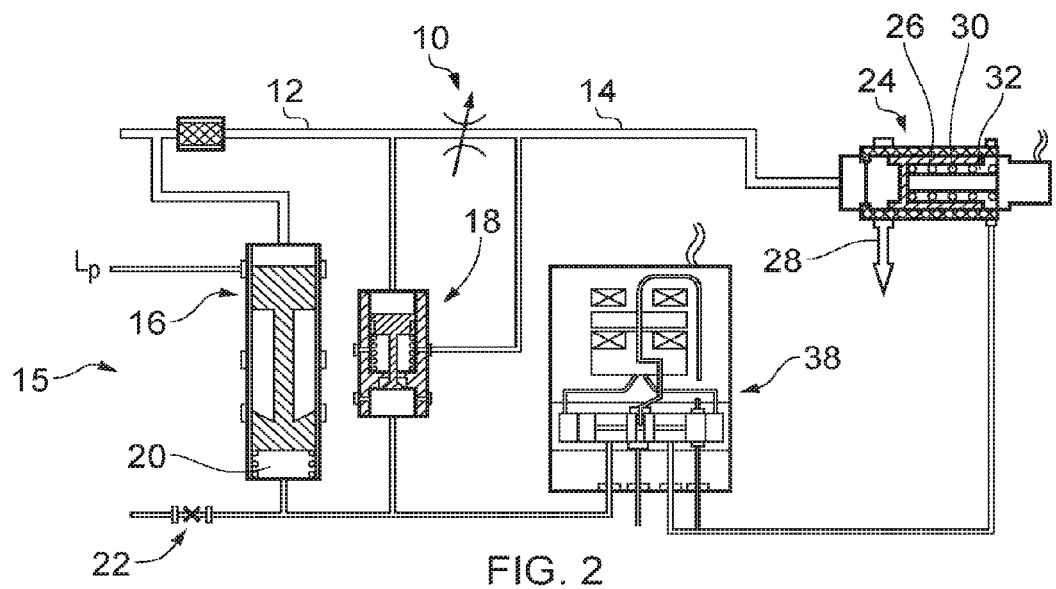
FIG. 2 is a diagram illustrating part of a fuel system for the engine of FIG. 1.

A part of a hydro-mechanical unit (HMU) of a fuel system suitable for use in the engine is illustrated diagrammatically in FIG. 2 and comprises a metering valve 10 operable to control the rate at which fuel is allowed to flow from a supply line 12 to a delivery line 14. The supply line 12 is connected to the outlet of a high pressure fuel pumping unit (not shown) which may take a range of forms. For example, the pumping unit could comprise an arrangement of one or more fixed displacement pumps, such as gear pumps, or could comprise an arrangement of one or more variable displacement pumps, such as vane pumps or piston pumps, or could comprise any combination of fixed and variable displacements pumps. The part of the fuel system illustrated in FIG. 2 is designed for use with a gear pump arrangement of the type in which two gear pumps are provided, one of which supplies fuel directly to the supply line 12, the output of the other of the gear pumps being supplied to the supply line 12 only when there is a high demand for fuel. However, it will be appreciated that other forms of pumping unit may be provided and the invention is not restricted in this regard.

A pressure drop control arrangement 15 is connected to the supply line 12 and metering valve 10 and is operable to maintain a substantially constant pressure drop across the metering valve 10. The pressure drop control arrangement 15 comprises a spill valve 16 and a pressure drop control valve 18.

The spill valve 16 is connected to the supply line 12 and is operable to allow fuel to pass from the supply line 12 to the low pressure side of the fuel pumping unit, thus altering the fuel flow through the supply line 12 and the metering valve 10. The spill valve 16 is a combining spill valve and further serves to control whether or not the output from the second gear pump is supplied to the supply line 12. Combining spill valves are of well known form and so the manner in which it operates to achieve this function is not described herein.

The pressure drop control valve 18 monitors the pressure drop across the metering valve 10 and controls the fuel pressure applied to a spill valve control chamber 20 of the spill valve 16 to control the operation of the spill valve 16. The manner in which the pressure drop control valve 18 operates is such that, if the pressure drop across the metering valve 10 is greater than a predetermined value, then the pressure drop control valve 18 reduces the fuel pressure within the spill valve control chamber 20. By reducing the fuel pressure within the spill valve control chamber 20, the spill valve 16 opens to allow fuel flow to be diverted from the supply line 12 to the low pressure side of the pumping unit at an increased rate, thereby reducing the fuel flow through, and hence the pressure drop across, the metering valve 10. If the pressure drop across the metering valve 10 becomes too small, then the operation of the pressure drop control valve 18 is such that the fuel pressure within the spill valve control chamber 20 will rise by virtue of a restricted connection 22 to high pressure. The increase in the fuel pressure within the spill valve control chamber 20 urges the spill valve 16 towards a closed position reducing the rate at which fuel flow is diverted from the supply line 12 to the low pressure side of the pumping unit with the result that the fuel flow through, and hence the fuel pressure drop across, the metering valve 10 increases.

Figure 3:
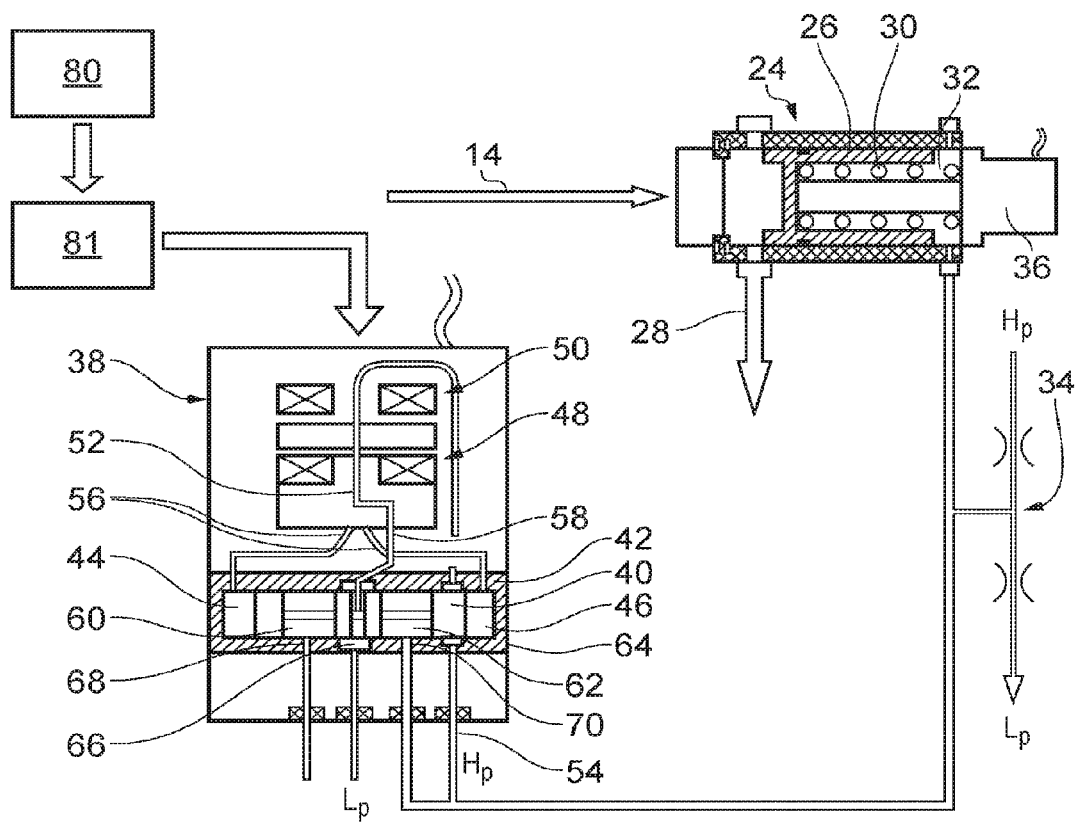
FIG. 3 is an enlarged view illustrating two of the valves within the part of the fuel system of FIG. 2.

A pressure raising and shut-off valve (PRSOV) 24 is connected to the delivery line 14. The PRSOV 24 comprises a valve member 26 slidable within a bore between a closed position in which the PRSOV 24 prevents fuel delivery from the delivery line 14 to a line 28 connected to the burner manifold of the engine, and an open position in which such fuel flow is permitted. The valve member 26 is biased by a spring 30 towards the closed position. The PRSOV 24 further comprises a PRSOV control chamber 32 to which fuel at a pressure governed by a fuel pressure potentiometer network 34 is supplied, as illustrated in FIG. 3. It will be appreciated that the fuel pressure within the PRSOV control chamber 32 assists the spring 30 in urging the valve member 16 towards its closed position. A position sensor 36 in the form of an inductive probe is operable to sense the position of the valve member 26. In normal use, the PRSOV 24 serves to ensure that the fuel pressure within the delivery line 14, and hence the parts of the fuel system upstream thereof, is maintained at above a predetermined minimum level. The level at which the minimum pressure is set is dependent upon the forces applied to valve member 26 urging the valve member 26 in its closing direction. By ensuring that a predetermined minimum pressure level is maintained in the fuel system, it will be appreciated that the correct operation of any fuel pressure operated auxiliary devices that receive fuel under pressure from the fuel system can be maintained.

It is desirable to be able to ensure that engine control can be maintained in the event of an overthrust condition in which fuel is delivered to the burner manifold at a rate higher than is desired. Accordingly, the fuel system includes a control servo valve 38. This control servo-valve could comprise any one of a number of known electro-magnetically actuated progressive type valve arrangements, such as a torque motor actuated flapper, nozzle and spool valve arrangement or a progressive solenoid actuated clevis type valve arrangement. The preferred embodiment of the valve described hereafter is a two stage servo-valve comprising a torque motor actuated jet and nozzle first stage that affects the operation of a spool valve second stage, but many different control servo-valve architectures can be used.

The control-servo valve 38 comprises a spool 40 slidable within a bore formed in a housing 42. The spool 40 defines, with the housing 42 first and second chambers 44, 46, the fuel pressures within which are determined by the operation of an electro-magnetic controlled jet and nozzle first stage 48. The first stage 48 comprising a torque motor 50 operable to vary the position of a jet 52 supplied with fuel at high pressure from a line 54. The jet 52 is movable such that fuel under high pressure therefrom can be directed towards one or other of a pair of nozzles 56 associated with respective ones of the chambers 44, 46. In use, when the torque motor 50 is operated to move the jet 52 towards the left as illustrated in FIG. 3, it will be appreciated that the fuel pressure within the chamber 44 will rise thereby urging the spool 40 towards the right, fuel from the chamber 46 escaping therefrom to permit such movement. Operation of the torque motor 50 to urge the jet 52 in the opposite direction will result in movement of the spool 40 towards the left as illustrated in FIG. 3.

Use of a jet and nozzle first stage is advantageous in that it ensures that the second stage spool valve is maintained in a mid-position, commonly referred to as a null position, during normal operation of the fuel system. Further, blockage of the first stage jet and nozzle assembly by, for example, fuel borne debris does not result in the second stage spool 40 being forced away from the null position.

A resilient feedback spring 58 is connected between the jet 52 and the spool 40, the spring 58 being arranged to move the jet 52 to a position related to the position of the spool 40 when the torque motor 50 is not energised with the result that the de-energisation of the torque motor 50 results in the spool 40 being restored to a null position as described below. The feedback spring 58 is selected such that, when the torque motor 50 is energised, the feedback spring 58 can flex to allow movement of the spool 40 independently of the jet 52. Instead of using a feedback spring 58, connected between the jet 52 and the spool 40, to provide null-position resetting functionality in the design of the control servo-valve 38, separate resilient springs could be added to both ends of the spool 40, located in the respective chambers 44, 46, to provide the same functionality.

One of the advantages of using the form of control servo-valve 38 described above is that the second stage spool valve is actively controlled in a mid-position rather than being hard over on an end stop. Since the control servo-valve 38 only operates occasionally during flight, it is advantageous to have the second stage dithering around a control point, rather than being static, so as to avoid seizure due to silting or lacquering.

The spool 40 is provided with first and second annular galleries 60, 62, with high and low pressure connection ports 64, 66 connected, respectively, to parts of the fuel system at high and low pressure, with a port 68 connected to the spill valve control chamber 20, and with a port 70 connected to the PRSOV control chamber 32. The positioning of the ports and the dimensions of the annular galleries 60, 62 are such that the gallery 60 is in constant communication with the port 68 and the gallery 62 is in constant communication with the port 70 irrespective of the position of the spool 40. When spool 40 occupies its null position as shown in FIG. 3, the high and low pressure ports 64, 66 are closed, and the galleries 60, 62 communicate only with the respective ports 68, 70. In this position of the spool 40, it will be appreciated that the control servo valve 38 has no effect upon the operation of the fuel system. In this mode of operation, the pressure drop control valve 18 serves to maintain a substantially uniform pressure drop across the metering valve 10, controlling the operation of the spill valve 16 to achieve this, and the PRSOV 24 operates to maintain the fuel pressure within the control system at above a minimum pressure value. The metering valve 10 operates to control the rate at which fuel is delivered by the fuel system to the manifold of the associated engine and thus controls the operation of the associated engine.

Figure 4:
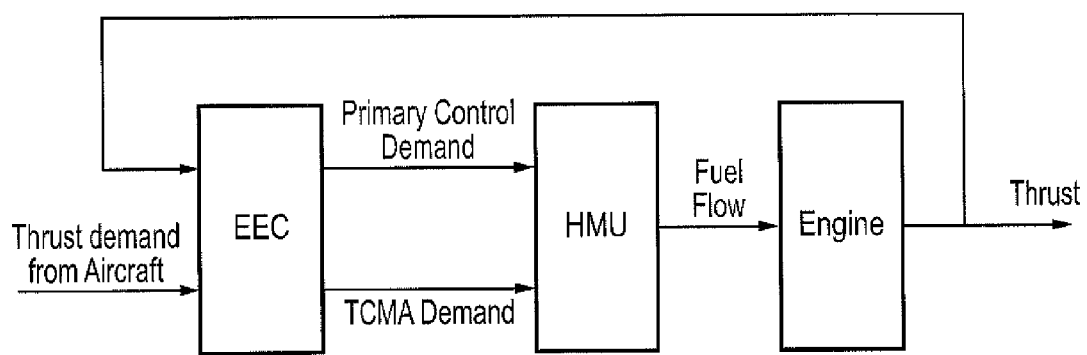
FIG. 4 is an overview block diagram showing the relationship between an electronic engine controller (EEC), a hydro-mechanical unit (HMU) of the fuel system, and the engine.

If it is determined that fuel is being delivered to the associated engine at too great a rate with the result that an overthrust condition has arisen (e.g. because of a failure such as a sticking metering valve 10), then the control servo valve 38 may be used to reduce the rate of fuel supply independently of the operation of the metering valve 10. In order to achieve this, the control servo valve 38 is operated in a thrust control mode in which the spool 40 is moved to a thrust control position by controlling the operation of the torque motor 50 to move the jet 52 towards the left as illustrated, thereby increasing the fuel pressure within the chamber 44 and causing movement of the spool 40 to the right in the orientation illustrated. FIG. 4 is an overview block diagram showing how the electronic engine controller (EEC) sends a primary control demand or, if necessary, a thrust control malfunction accommodation (TCMA) demand to the HMU.

The movement of the spool 40 and jet 52 in opposite directions results in the spring 58 being stressed, and the position of the jet 52 will be dependent upon both the level of the current applied to the torque motor 50 and the force exerted by the spring 58. Provided the spool 40 moves by only a relatively small distance, then the movement of the spool results in communication being established between the gallery 60 and the low pressure port 66, with the result that the fuel pressure within the spill valve control chamber 20 is reduced. Reduction of the fuel pressure within the spill valve control chamber 20 results in the spill valve 16 moving in the opening direction, increasing the rate at which fuel is able to escape from the supply line 12 to the low pressure side of the pump, and hence reducing the rate at which fuel flows from the supply line 12 to the delivery line 14 through the metering valve 10. The rate at which fuel is supplied to the associated engine is thus also reduced. The overthrust condition can thus be appropriately managed. Further, by appropriate control of the torque motor 50, the spool position and hence the degree of communication between the gallery 60 and the low pressure port 66 can be controlled, thus the fuel pressure within the spill valve control chamber 20, and hence the operation of the spill valve 16 can be controlled to achieve fuel delivery to the associated engine at a desired rate. The control of the control servo valve 38 in the thrust control mode is described in more detail below.

During the thrust control mode of operation, the gallery 62 remains isolated from the high and low pressure ports 64, 66 and so operation of the PRSOV is unchanged. However, in an extreme condition when it is necessary to shut-down the engine independently of the normal shut-down arrangement, or if testing of the operation of the fuel system is taking place, then the torque motor 50 may be controlled in such a manner as to move the spool 40 to an extreme right hand, test position in which not only is communication established between the gallery 60 and the low pressure port 66, but also communication is established between the gallery 62 and the high pressure port 64. In such circumstances, it will be appreciated that high pressure fuel is supplied from a high pressure line 54 via the high pressure port 64, the gallery 62 and the port 70 to the PRSOV control chamber 32, increasing the fuel pressure therein to a level higher than is achieved by the normal operation of the fuel pressure potentiometer network 34. Increasing the fuel pressure within the PRSOV control chamber 32 in this manner results in the force urging the valve member 26 thereof towards its closed position being increased to a level sufficient to move the valve member 26 to its closed position, thereby terminating the delivery of fuel to the associated engine manifold, which results in engine shut-down. The movement of the valve member 26 is sensed by the sensor 36 and can thus be used to provide an indication that the control servo valve 38 is operating correctly. It is recognised that the control servo-valve 38 could be designed such that in the thrust control mode it is capable of opening the spill valve 16 far enough to reduce the system pressure rise to a level that prevents the PRSOV from opening at start-up. Hence, the high pressure port 64 and line 54 would not be required to test the operation of the control servo-valve 38, although it is recognised that they may still be required to provide engine shut-down capability through operation of the control servo-valve 38 independently of the normal shut-down arrangement. Alternatively, a dedicated position sensor associated with the control servo-valve 38, for example monitoring movement of the spool 40, could be used to confirm correct operation. Further, the described two-stage control servo-valve 38 could be replaced by an arrangement comprising a single stage servo-valve in the form of, for example, a torque motor actuated flapper and nozzle assembly, which controls an independent second stage spool valve.

In either the thrust control mode or shut-down (test) mode of operation, when the spool 40 has been moved as a result of the operation of the torque motor 50, upon de-energisation of the torque motor 50 the spring 58 will force the jet 52 to move to a position related to the position of the spool 40. As a result of such movement, it will be appreciated that fuel under high pressure is delivered by the jet 52 to the other of the nozzles 56 with the result that the fuel pressure within the chamber 46 is increased, moving the spool 40 towards the left. This spool movement results in the spring 58 forcing the jet 52 to return to a null position between the two nozzles 56. When the spool 40 reaches its null position, as illustrated in FIG. 3, spool movement will cease as the pressures applied to the chambers 44, 46 will be substantially equal.

A further advantage of the thrust control mode of operation of the control servo-valve 38 is that the low pressure port 66 is closed off from the port 70 to the PRSOV control chamber 32, and consequently the minimum system pressure rise, is set by the fuel pressure potentiometer network 34 at a relatively high level. This ensures correct operation of fuel pressure operated auxiliary devices, and in particular engine variable geometry actuators, during an overthrust event. This would somewhat offset the reduction in system pressure rise that would be expected if the cause of the overthrust was an upward runaway of the metering valve 10.

As discussed in EP 2339147 A, the control servo valve 38 can also be used to provide a windmill relighting capability.

We consider now in more detail control of the control servo valve 38 in the thrust control mode. Torque motor control of the control servo-valve 38 may be achieved by applying a pullback signal, for example a pullback current, thereto. For example, in the thrust control mode of operation the position of the spool 40 may be adjusted by varying the current applied to the torque motor 50 of the electromagnetically controlled first stage 48 of the control servo-valve 38. This will control the spill valve control chamber pressure and thereby achieve proportional control over the fuel delivery rate independently of the metering valve 10.

However, during the thrust control mode of operation, a difficulty generally arises in that a rapid response is required to provide overspeed protection, but the relation between pullback current and engine power output is non-linear and the feedback between pullback current and power output is slow. Further, variability in the servo-valve 38 tolerances can be significant, making it difficult to reliably characterize the behavior of the servo-valve. These can lead to problems such as:
  excessive fuel dip, causing flameout,
  inadequate speed of thrust reduction, and
  significant undershoot of the engine set-point.

To address these difficulties, rather than attempting to impose closed loop control of the pullback current based on the engine power output immediately that overthrust is detected, a thrust control malfunction accommodation (TCMA) procedure according to the present invention can be adopted in which:
  i. at the time of overthrust detection, a rate of increase of the pullback current and an offset of the pullback current are calculated,
  ii. the pullback current is sent to the torque motor 50 of the control servo-valve 38 and increased over time at the determined rate, and
  iii. when the upward runaway caused by the overthrust is arrested, the pullback current sent to the torque motor 50 is reduced by the determined offset.

This procedure can rapidly arrest the upward runaway and commence thrust reduction. It can also help to mitigate the threat of flameout. In addition, smoother engine control and reduced undershoot of the engine set-point can be achieved.

After the pullback current is reduced by the determined offset, the procedure can subsequently include:
  iv. maintaining the pullback current at its reduced value for a predetermined time period, and
  v. thereafter introducing closed loop control (e.g. PID control) of the pullback current based on the engine power output.

Figure 5:
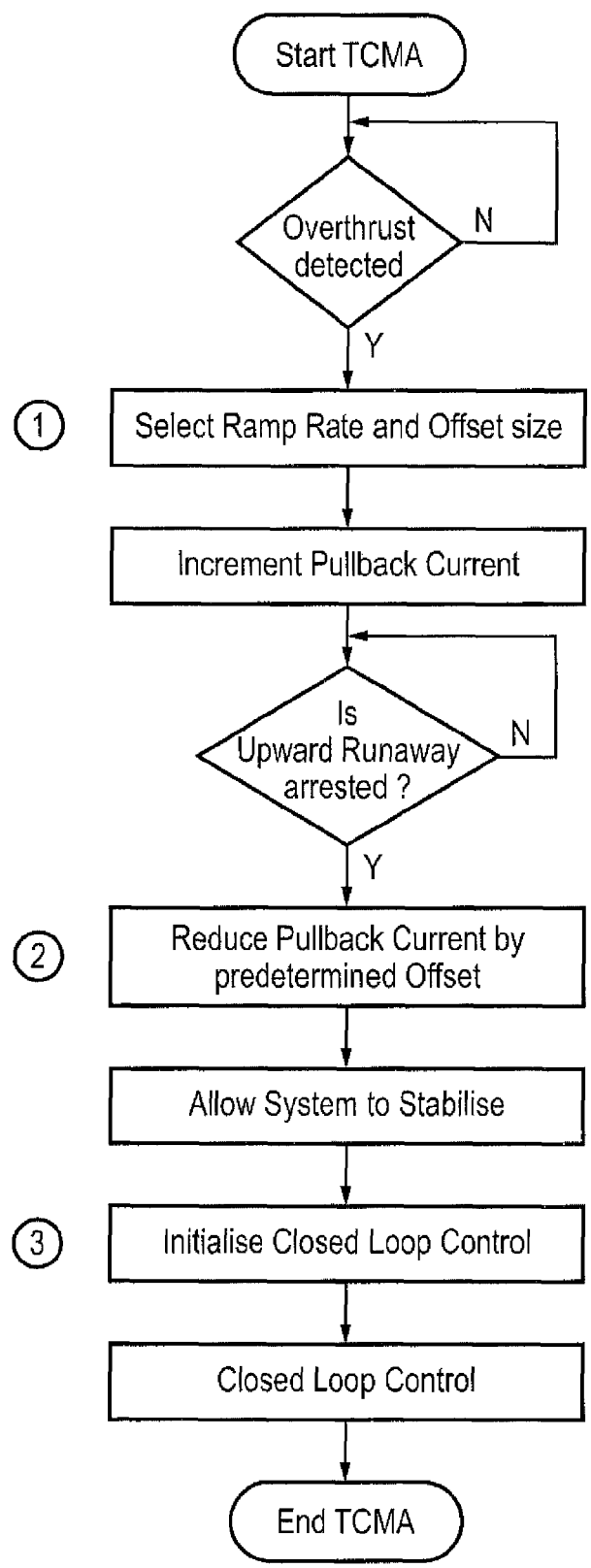
FIG. 5 is a flow diagram illustrating a thrust control mode accommodation (TCMA) procedure according to the present invention.
Figure 6:
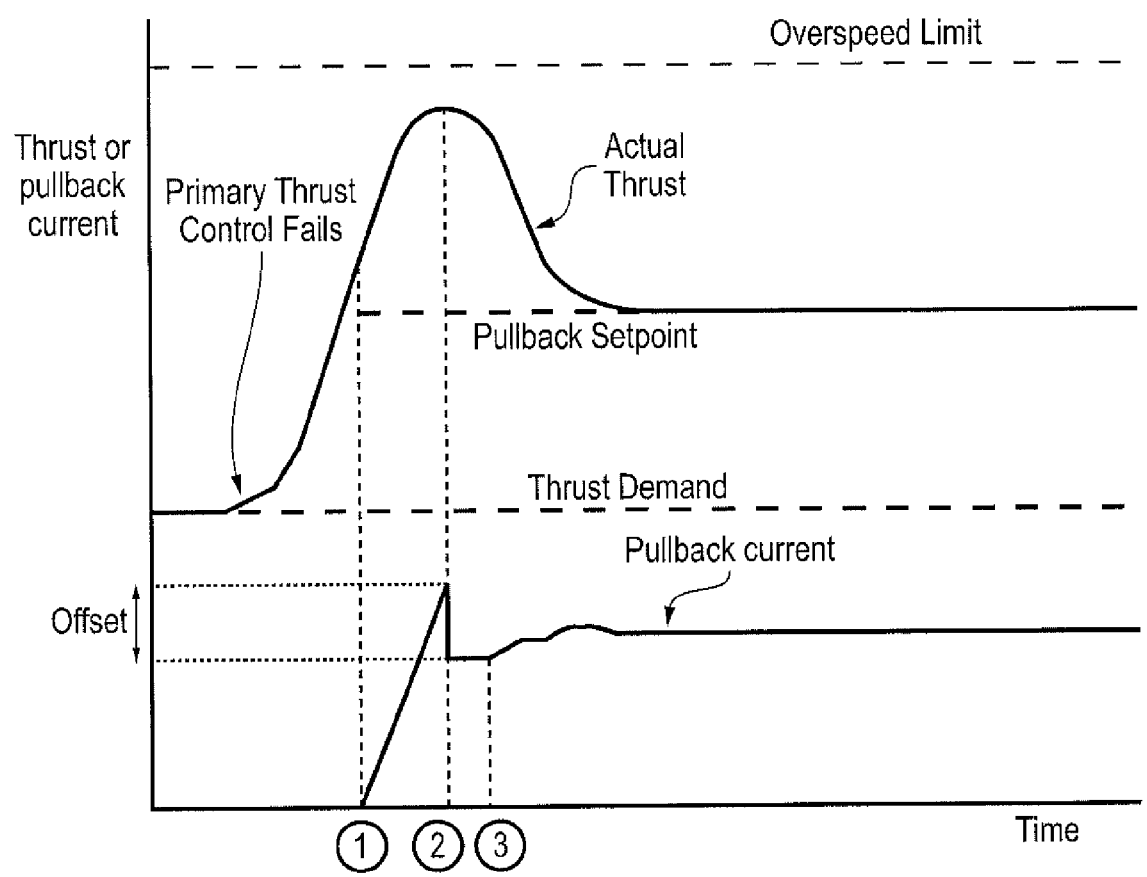
FIG. 6 shows schematic graphs of engine thrust against time and pullback current against time for the TCMA procedure of FIG. 5.

This TCMA procedure is illustrated in the flow diagram of FIG. 5. To show how the stages of the TCMA procedure correlate with the engine thrust, FIG. 6 provides a schematic graph of engine thrust against time and a corresponding schematic graph of pullback current against time. The circled numbers 1-3 indicate three stages from the flow diagram of FIG. 5 and the corresponding times on the graphs of FIG. 6.

As shown in FIG. 3, a detector 80 is arranged to detect the engine overthrust event. For example, the detector 80 can monitor a rotational speed (termed "N1" or "NL") of the shaft connecting the propulsive fan 112 to the low-pressure turbine 118. An overthrust event can be detected when the measured speed of the shaft exceeds its expected speed. This is a fast, accurate, convenient and reliable method of detecting an overthrust event, but other approaches may be adopted to detect overthrust, such as monitoring of engine pressure ratios.

Figure 7:
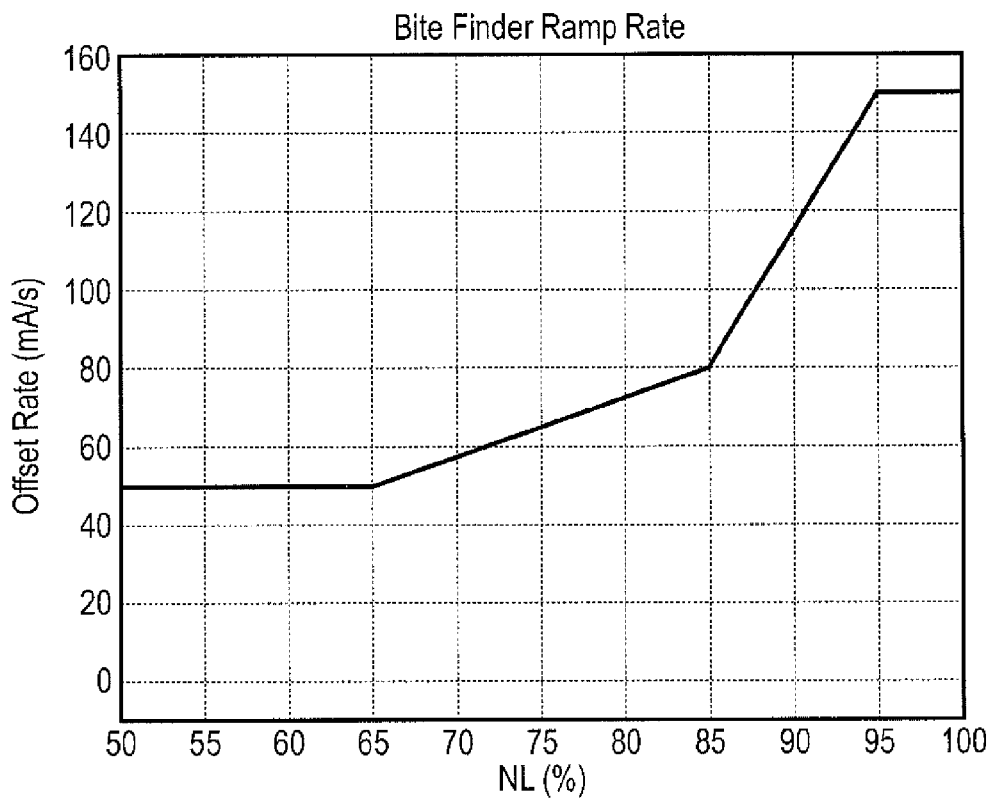
FIG. 7 shows an example graph of rate of increase of a pullback current against shaft speed (NL) for the TCMA procedure of FIG. 5.
Figure 8:
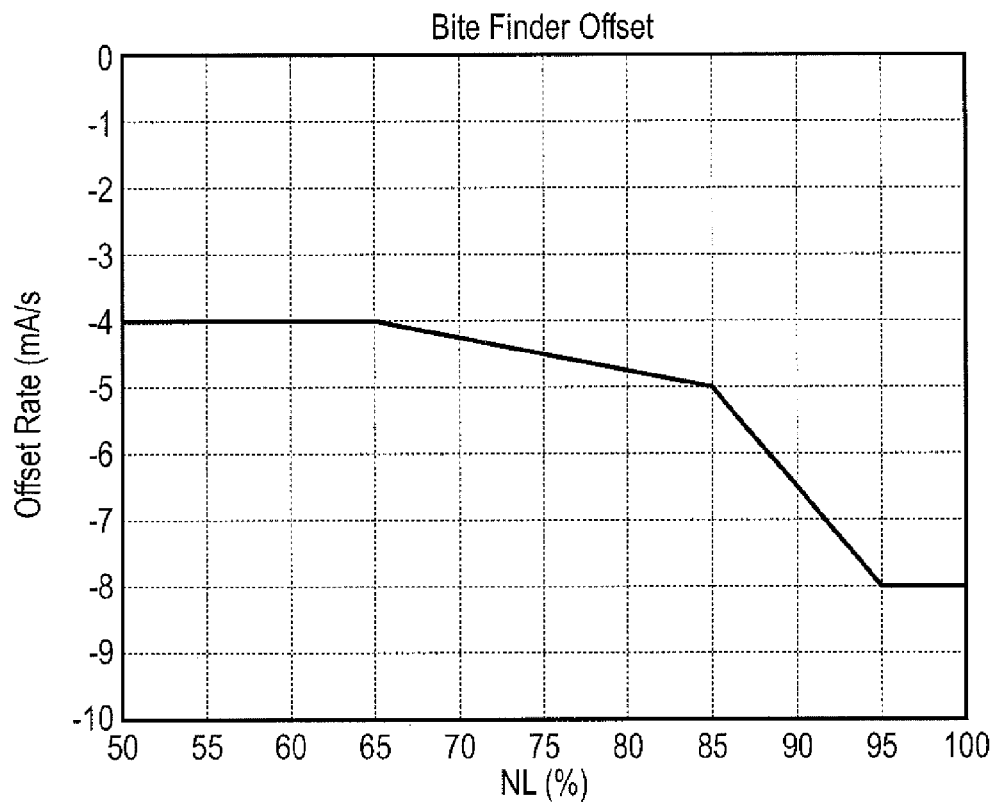
FIG. 8 shows an example graph of rate of pullback current offset against shaft speed (NL) for the TCMA procedure of FIG. 5.

On detection of an overthrust event, a controller 81 (which may be part of the EEC) determines a rate of increase of the pullback current and an offset of the pullback current. The determinations of the rate of increase of the pullback current and the offset are generally as functions of engine power output, and may be based on look-up tables. NL is a convenient measure of engine power output, and FIGS. 7 and 8 show example graphs of rate of increase of a pullback current against NL, and pullback current offset against NL.

The rate of increase of the pullback current can, conveniently, be applied as a constant rate over time, leading to the linear increase in pullback current seen between circled numbers 1 and 2 in the lower graph of FIG. 6. The increasing pullback current in turn produces a reduction in fuel flow to the engine burners.

The detector 80 also detects when the upward runaway caused by the overthrust event is arrested (i.e. the shaft rotational speed stops accelerating, corresponding to circled number 2 in the upper graph of FIG. 6) by the increasing pullback current (and reducing fuel flow). On arrest of the upward runaway, the controller 81 drops the pullback current by the determined offset, as indicated in FIG. 6. The drop in pullback current helps to avoid an overly aggressive overshoot in the fuel flow reduction which might otherwise cause engine flameout. The controller subsequently ensures that the pullback current is maintained at its reduced value for the predetermined time period, which helps the fuel supply to settle before the controller introduces closed loop control of the pullback current based on e.g. shaft speed.

Lead lag compensation can be applied to the determination of the rate of change of engine speed to counteract delays introduced by the speed measurement system. A mapped function of engine speed to set the rate threshold can also be introduced, arranged so that if the speed is relatively low when control is regained, a transition into closed loop operation can occur sooner (whilst a limited degree of acceleration persists) without a risk of the engine reaching an overspeed threshold. The combined effect of using lead lag compensation and a mapped threshold is that upward runaway can be detected slightly sooner. This is advantageous because, although the pullback current offset is effective at reducing the impact of the inherent overshoot, it is better to avoid as far as possible the overshoot in the first place.

As mentioned above, PID control of the pullback current can be introduced after the pullback current has been maintained at its reduced value for the predetermined time period. The manner in which the PID controller is initialised can impact on the success of the inventive TCMA procedure. Thus preferably the PID controller incorporates the following features:
  upon initialisation, the PID integral (I) term is set equal to the output of the open loop phase minus the currently determined proportional (P) term,
  the setpoint for the PID controller is initialised based upon the current engine speed and the desired engine speed, being set no more than 3% away from the current engine speed in the direction of the desired engine speed, the setpoint then ramps towards the desired engine speed at a predetermined rate (which should not exceed the engine's capabilities to respond), and subsequently, if the desired engine speed changes (e.g. due to a change in flight condition), the setpoint again ramps at a predetermined rate towards the new desired engine speed These features help to ensure that for all scenarios the closed loop gives an appropriate response from the first cycle of operation, and allow the PID controller to utilise relatively high gains. They also take account of the first order ramp following error that is inherent to PID control with a changing setpoint.

To demonstrate the improved TCMA performance using the present invention, engine performance during a series of TCMA scenarios was modelled using computer numerical simulation. For each scenario, engine performance was modelled based on the use of a conventional PID closed loop control TCMA scheme, as well as the TCMA pullback scheme of the present invention described above. The conventional scheme utilises two PID controllers, the first controller being tuned with high gains to rapidly arrest the upward runaway, and the second being tuned with low gains. Initially the first controller is enabled and the second disabled. When the rate of change of engine speed falls below a threshold and the upward runaway is deemed arrested, the first controller is disabled and the second is enabled with the aim of providing robust stable control. For each scenario, consideration was also given in the simulations to the effect that slow-, normal- and fast-acting control servo-valves (SV) 38 have on TCMA and engine performance, in order to account for variability in servo-valve component manufacture and performance.

Figure 9:
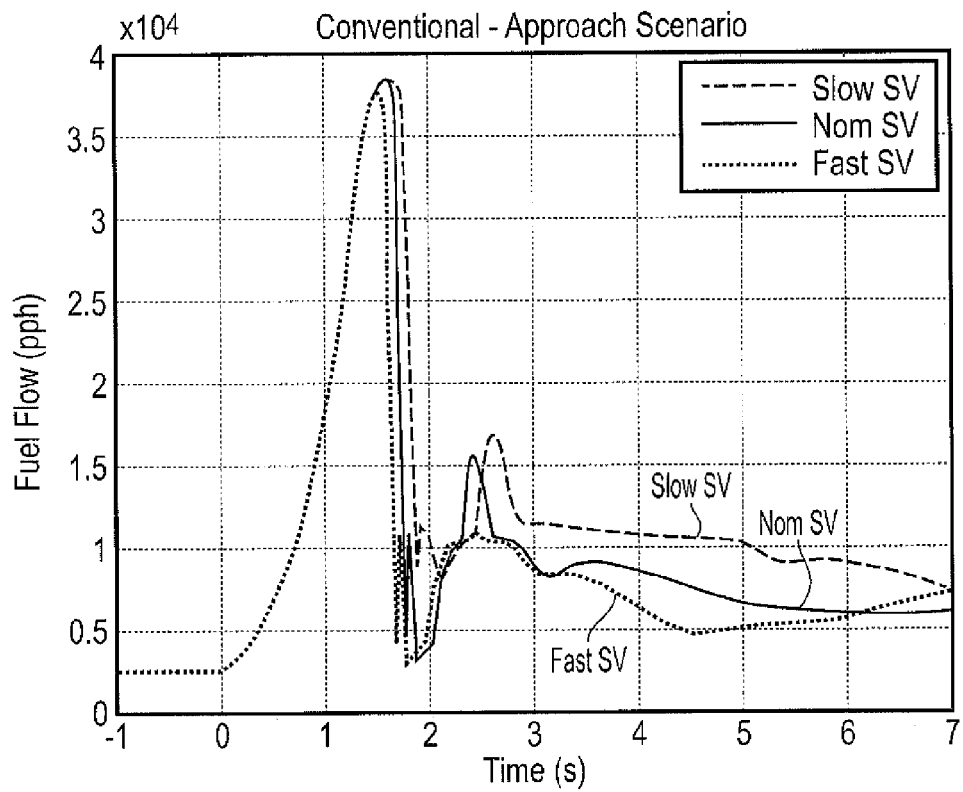
FIG. 9 shows a graph of engine fuel flow against time for a modelled TCMA procedure using conventional closed loop control during an aircraft landing approach scenario.
Figure 10:
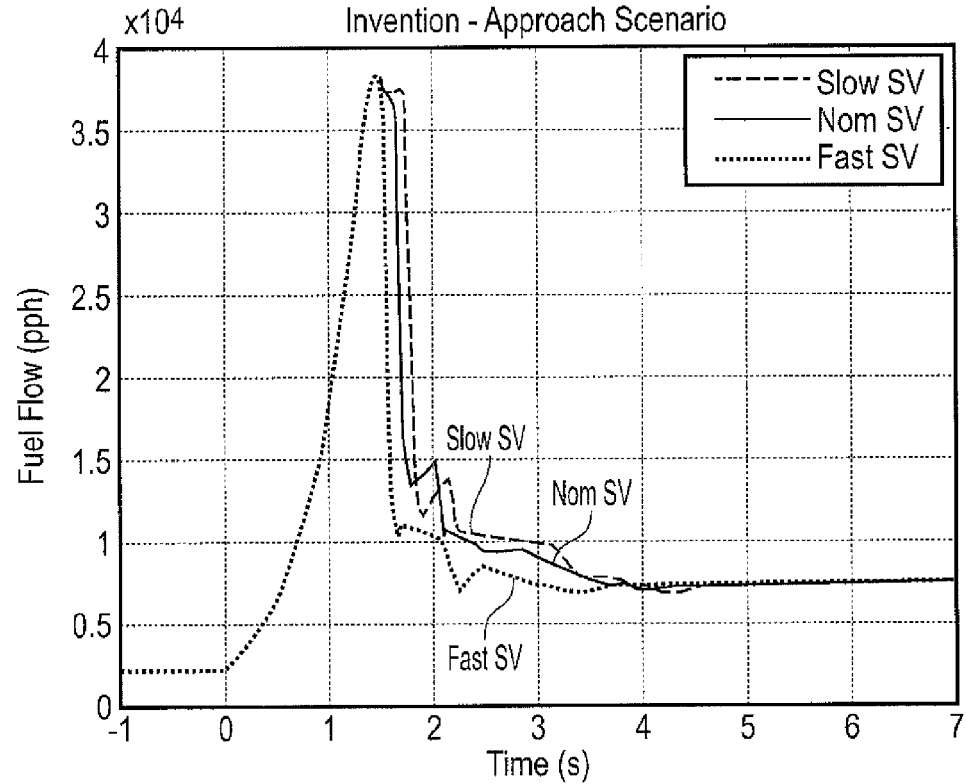
FIG. 10 shows a graph of engine fuel flow against time for a modelled TCMA procedure according to the present invention during the aircraft landing approach scenario.

FIGS. 9 and 10 show respectively graphs of fuel flow against time during the operation of the conventional PID closed loop control and inventive pullback TCMA schemes during an aircraft landing approach scenario. With the conventional TCMA scheme the initial reduction in fuel flow at around 1.6 sec is too aggressive, leading to a possible engine flameout event. In contrast, with the inventive pullback TCMA scheme, the initial reduction in fuel flow is less aggressive, and thereafter the fuel flow settles more rapidly and with much less variability towards a new stable fuel flow set point.

Figure 11:
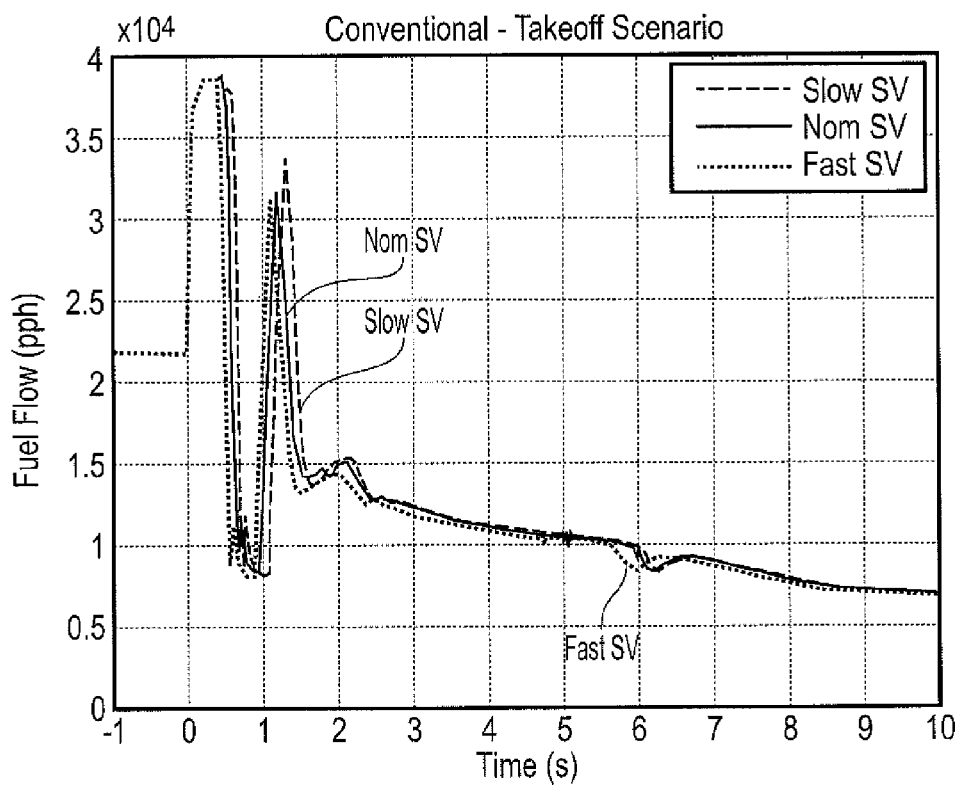
FIG. 11 shows a graph of engine fuel flow against time for the modelled TCMA procedure using conventional closed loop control during an aircraft take-off scenario.
Figure 12:
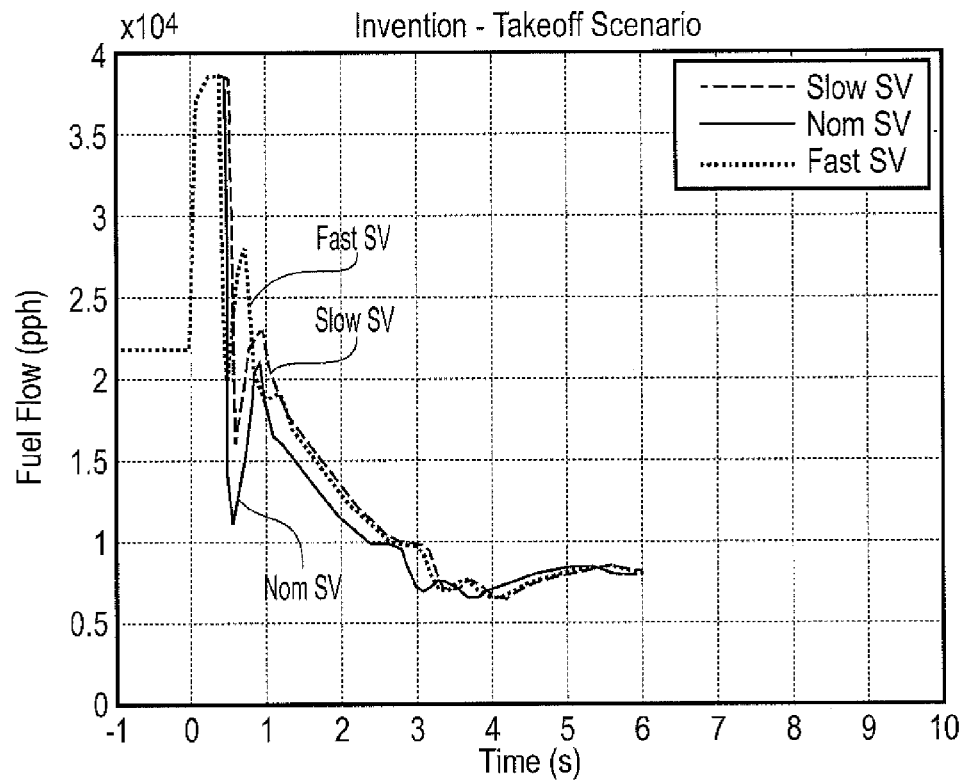
FIG. 12 shows a graph of engine fuel flow against time for the modelled TCMA procedure according to the present invention during the aircraft take-off scenario.

FIGS. 11 and 12 show respectively graphs of fuel flow against time during the operation of the conventional and inventive TCMA schemes during an aircraft take-off scenario. With the conventional TCMA scheme the initial reduction in fuel flow at around 0.4 sec is again too aggressive, leading to a possible engine flameout event. Subsequently, the fuel flow oscillates significantly and struggles to settle to a new set point. In contrast, with the inventive scheme, the initial reduction in fuel flow is much less aggressive, and thereafter the fuel flow settles rapidly with few oscillations and less variability. The new set point is reached after about only 5 sec.

Figure 13:
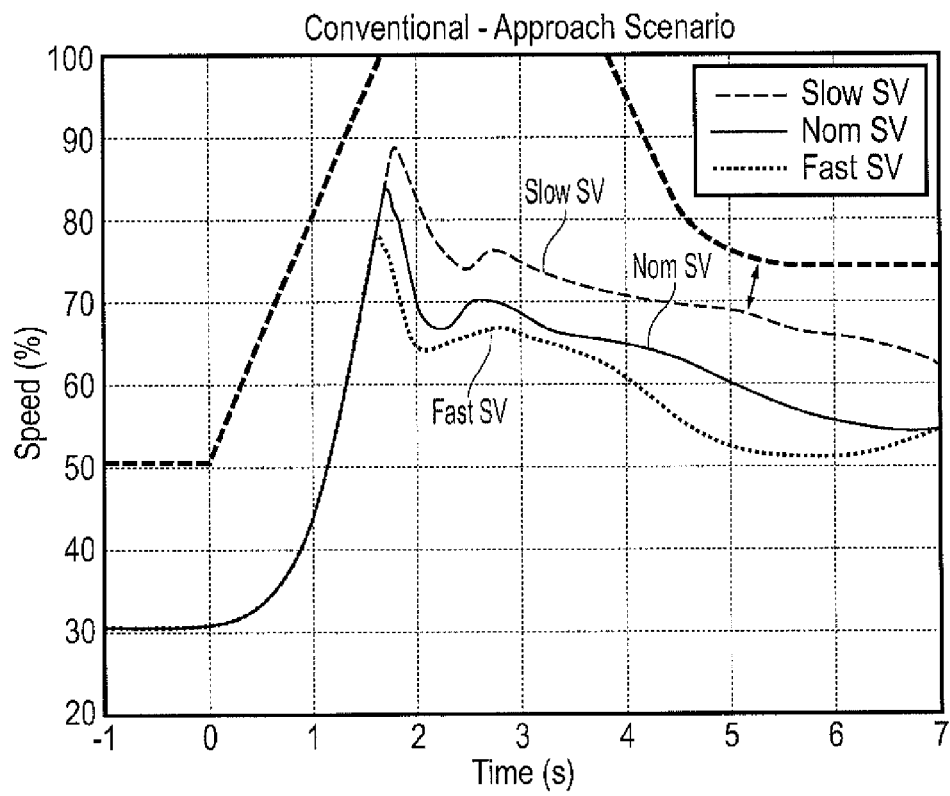
FIG. 13 shows a graph of engine speed (NL) against time for the modelled TCMA procedure using conventional closed loop control during the aircraft landing approach scenario.
Figure 14:
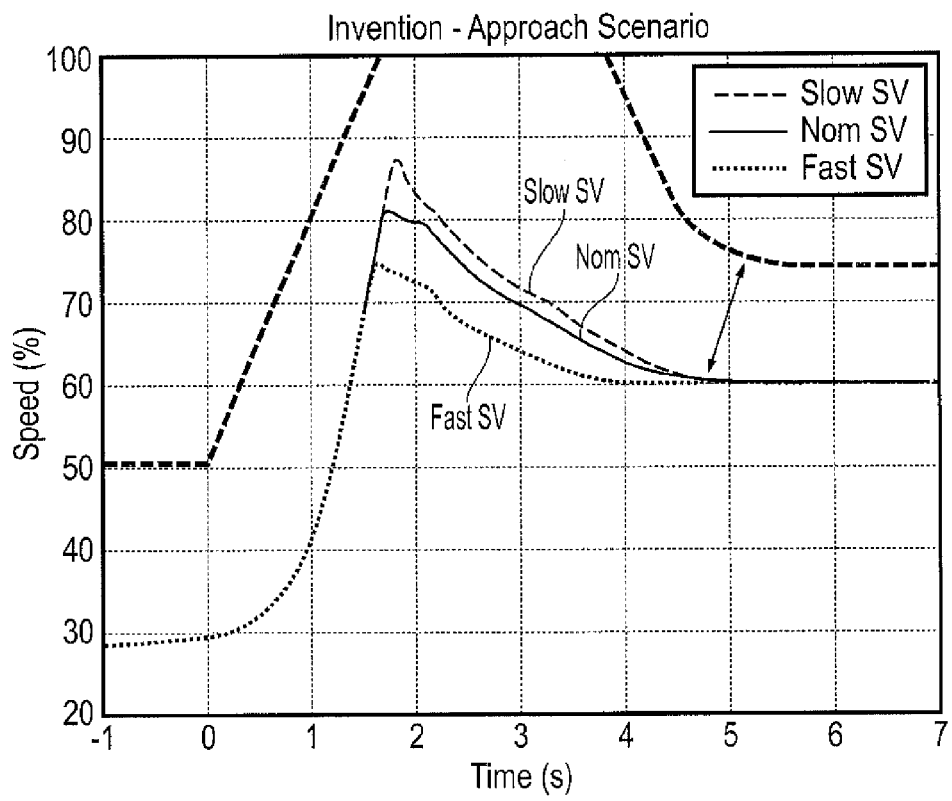
FIG. 14 shows a graph of engine speed against time for the modelled TCMA procedure according to the present invention during the aircraft landing approach scenario.

Next FIGS. 13 and 14 show respectively graphs of engine speed (NL) against time during the operation of the conventional and inventive TCMA schemes during the aircraft landing approach scenario. With the inventive scheme a more controlled reduction in the shaft speed and faster convergence to the new set point at 60% speed, along with a reduced impact of servo-valve variance, is achieved when compared with the conventional scheme. Both graphs also show with a dashed line a desired operational maximum limit on shaft speed associated with the overthrust event. The improved performance of the inventive scheme allows a larger operational margin (indicated by the length of the double headed arrows) to be maintained.

Figure 15:
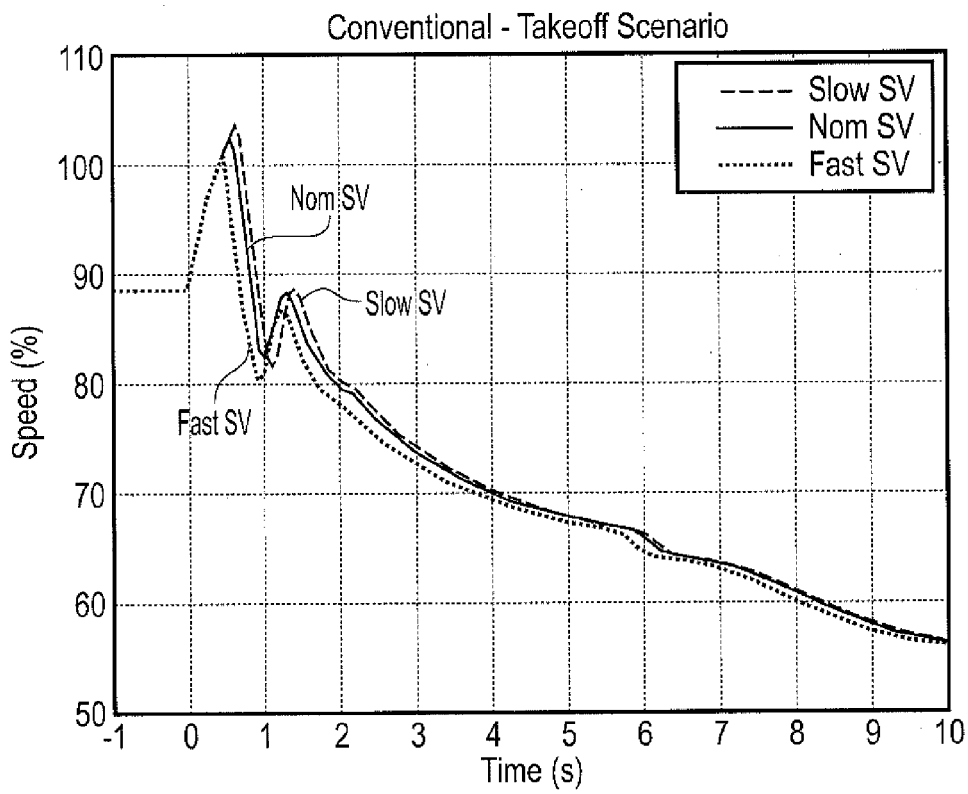
FIG. 15 shows a graph of engine speed against time for the modelled TCMA procedure using conventional closed loop control during the aircraft take-off scenario.
Figure 16:
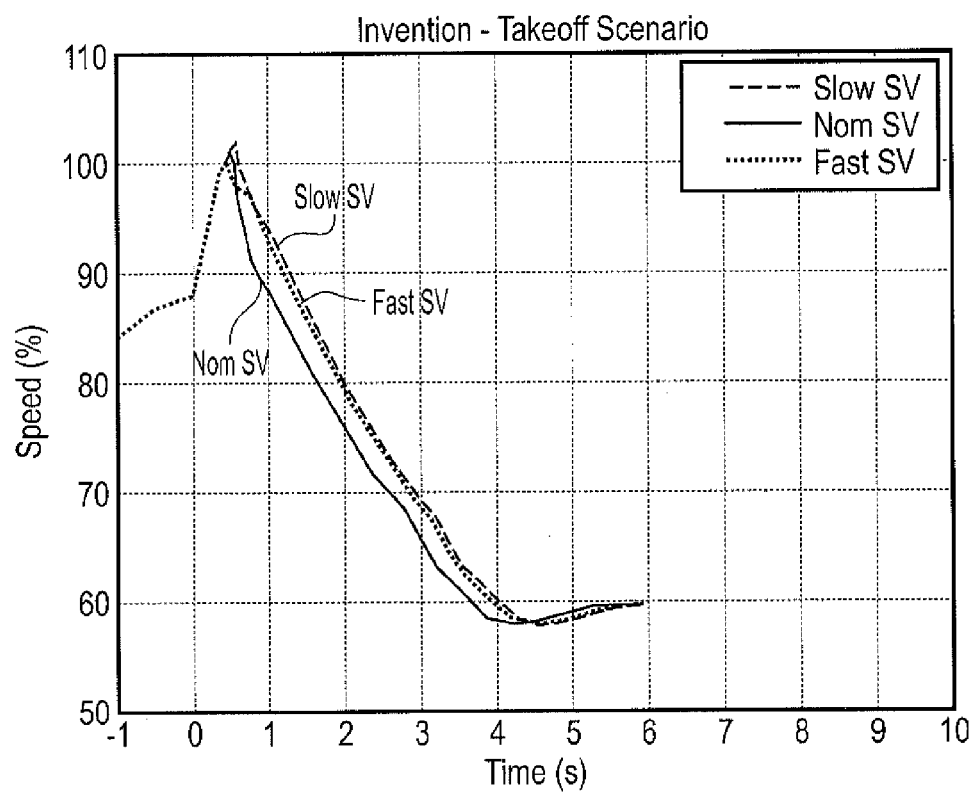
FIG. 16 shows a graph of engine speed against time for the modelled TCMA procedure according to the present invention during the aircraft take-off scenario.

FIGS. 15 and 16 show respectively graphs of engine speed (NL) against time during the operation of the conventional and inventive TCMA schemes during the aircraft take-off scenario. The inventive scheme provides a faster and smoother convergence to the new set point at 60% speed when compared with the conventional scheme, which even after 10 sec does not give a settled 60% speed.

Figure 17:
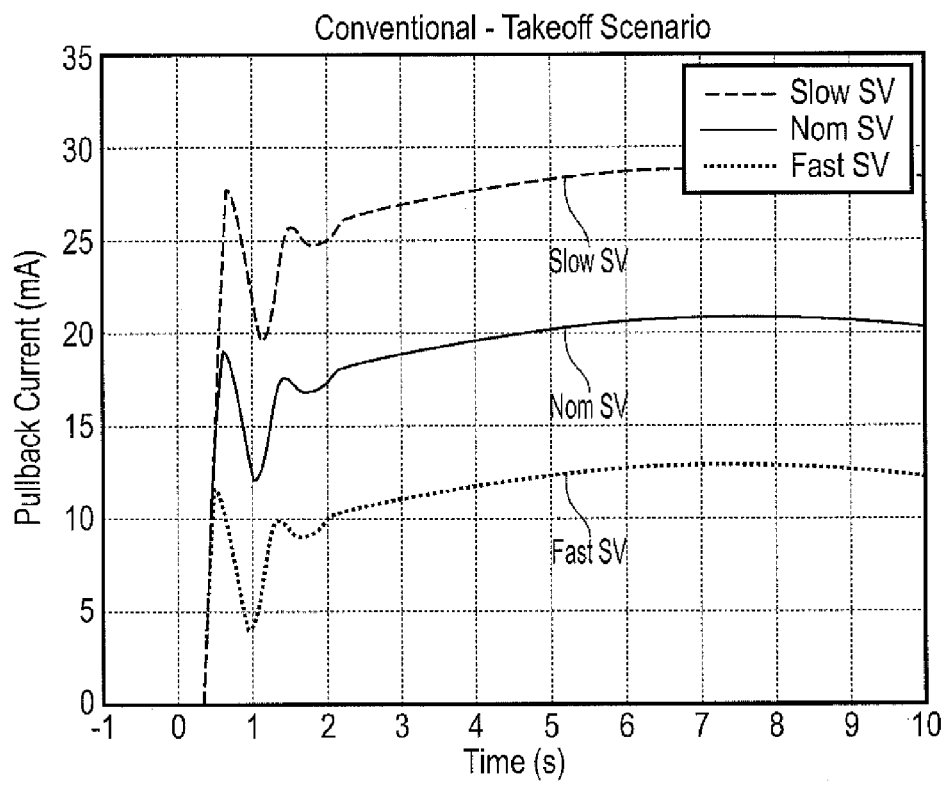
FIG. 17 shows a graph of pullback current against time for the modelled TCMA procedure using conventional closed loop control during the aircraft take-off scenario.
Figure 18:
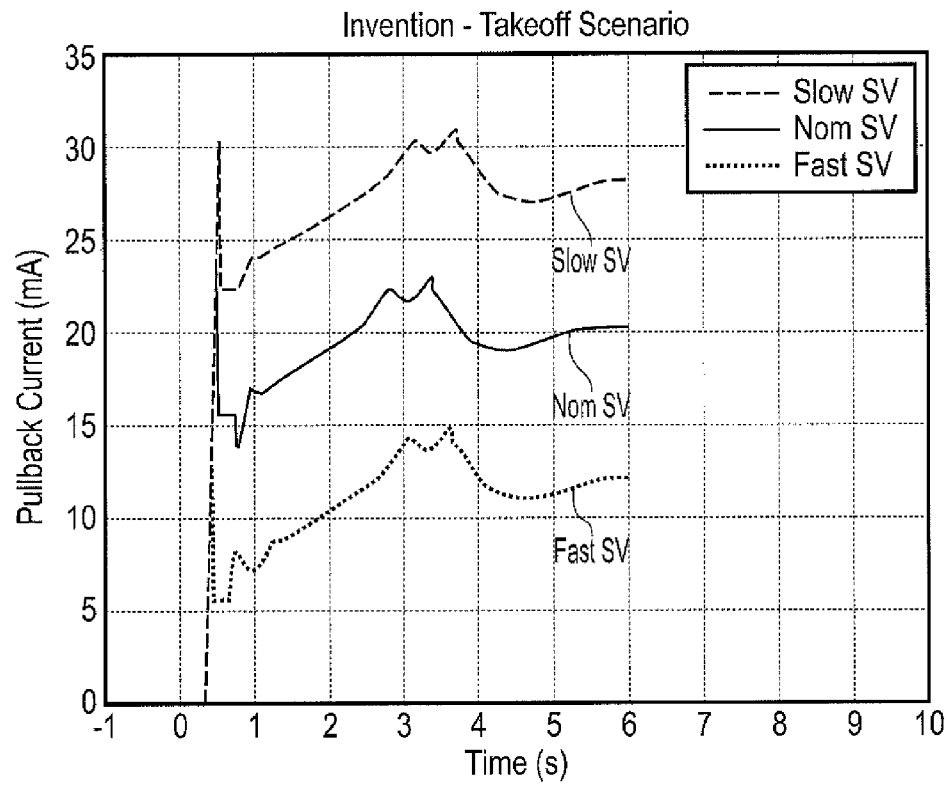
FIG. 18 shows a graph of pullback current speed against time for the modelled TCMA procedure according to the present invention during the aircraft take-off scenario.

FIGS. 17 and 18 show respectively graphs of pullback current against time during the operation of the conventional and inventive TCMA schemes during the aircraft take-off scenario. The response of the inventive pullback scheme under the subsequent closed loop control is more dynamic than the response of the conventional closed loop control scheme.

While the invention has been described in conjunction with the exemplary embodiments described above, many equivalent modifications and variations will be apparent to those skilled in the art when given this disclosure. For example, instead of controlling the control servo-valve 38 by a pullback current, it may be controlled by a pullback voltage. Accordingly, the exemplary embodiments of the invention set forth above are considered to be illustrative and not limiting. Various changes to the described embodiments may be made without departing from the scope of the invention.

All references referred to above are hereby incorporated by reference.

What is claimed is:

1. An engine fuel control system including:
    a fuel metering valve operable to control a flow of fuel between a supply line and a delivery line,
    a pressure drop control arrangement operable to regulate a pressure drop across the metering valve, the pressure drop control arrangement maintaining in normal use a substantially constant pressure drop across the metering valve,
    an electro-mechanical backup control system which, in the event of an engine overthrust event, is controllable by an electrical pullback signal to operate the pressure drop control arrangement, such that increasing the pullback signal reduces the flow of fuel between the supply line and the delivery line,
    a detector arrangement which detects a start of an engine overthrust event, and detects a time at which an upward runaway caused by the overthrust event is arrested, and
    a controller which (i) determines, at the time of the overthrust detection, a rate of increase of the pullback signal and an offset of the pullback signal, (ii) sends the pullback signal to the backup control system at the determined rate of increase, and (iii), when the upward runaway is arrested, reduces the pullback signal sent to the backup control system by the determined offset.

2. The engine fuel control system according to claim 1, wherein the controller determines the rate of increase of the pullback signal as a function of an indicator of engine power output.

3. The engine fuel control system according to claim 1, wherein the rate of increase of the pullback signal is constant over time.

4. The engine fuel control system according to claim 1, wherein the controller determines the pullback signal offset as a function of an indicator of engine power output.

5. The engine fuel control system according to claim 1, wherein the controller (iv), when the upward runaway is arrested, maintains the pullback signal at its reduced value for a predetermined time period.

6. The engine fuel control system according to claim 5, wherein the controller (v), at the end of the predetermined time period, applies closed loop control of the pullback signal based on an indicator of engine power output.

7. The engine fuel control system according to claim 1, wherein the backup control system includes an electromagnetically operated control servo valve.

8. The engine fuel control system according to claim 1, wherein the pressure drop control arrangement comprises a pressure drop control valve and a spill valve.

9. The engine fuel control system according to claim 8, wherein the spill valve includes a control chamber and is operable to control fuel flow within the supply line, and the pressure drop control valve is operable to vary the spill valve control chamber pressure to maintain in normal use the substantially constant pressure drop across the metering valve.

10. The engine fuel control system according to claim 9, wherein the spill valve is a combining spill valve, operable to supply fuel to the supply line from a plurality of fuel pumps.

11. The engine fuel control system according to claim 8, wherein the spill valve is a combining spill valve, operable to supply fuel to the supply line from a plurality of fuel pumps.

12. An engine fuel control system according to claim 1, further including a pressure raising and shut-off valve which controls the passage of fuel from the delivery line.

13. The engine fuel control system according to claim 1, wherein the engine control system is for a gas turbine engine.

14. The engine fuel control system according to claim 13, wherein the controller determines the rate of increase of the pullback signal as a function of a shaft rotational speed of the gas turbine engine.

15. A gas turbine engine having the engine fuel control system of claim 1.

\* \* \* \* \*